(12) United States Patent
Kim

(10) Patent No.: US 9,743,069 B2
(45) Date of Patent: Aug. 22, 2017

(54) CAMERA MODULE AND APPARATUS FOR CALIBRATING POSITION THEREOF

(71) Applicant: LG INNOTEK CO., LTD., Seoul (KR)

(72) Inventor: Min Soo Kim, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 760 days.

(21) Appl. No.: 13/975,009

(22) Filed: Aug. 23, 2013

(65) Prior Publication Data

US 2014/0063202 A1   Mar. 6, 2014

(30) Foreign Application Priority Data

Aug. 30, 2012  (KR) .................. 10-2012-0095343
Sep. 26, 2012  (KR) .................. 10-2012-0107002

(51) Int. Cl.
*H04N 13/02* (2006.01)
*G01C 3/00* (2006.01)

(52) U.S. Cl.
CPC ..... *H04N 13/0246* (2013.01); *H04N 13/0239* (2013.01); *H04N 13/0242* (2013.01)

(58) Field of Classification Search
CPC ........ H01N 9/04; H01N 13/02; H01N 13/246; H01N 13/239; H01N 13/242; G01C 3/00; G06T 15/00; G02B 15/14
See application file for complete search history.

(56) References Cited

U.S. PATENT DOCUMENTS

| | | | |
|---|---|---|---|
| 6,522,325 B1 | 2/2003 | Sorkin et al. | |
| 2007/0264002 A1 | 11/2007 | Lee | |
| 2008/0218657 A1 | 9/2008 | Hwang et al. | |
| 2009/0015662 A1 | 1/2009 | Kim et al. | |
| 2009/0168195 A1* | 7/2009 | Watanabe ............ | G02B 15/173 359/687 |
| 2011/0199497 A1 | 8/2011 | Motta et al. | |
| 2012/0038631 A1* | 2/2012 | Mayhew ............. | G06F 3/04815 345/419 |
| 2012/0188420 A1* | 7/2012 | Black ................... | H04N 5/2253 348/279 |

FOREIGN PATENT DOCUMENTS

| | | |
|---|---|---|
| CN | 101361019 A | 2/2009 |
| JP | 2012-132739 A | 7/2012 |
| WO | WO 2012/036102 A | 3/2012 |

* cited by examiner

*Primary Examiner* — Sath V Perungavoor
*Assistant Examiner* — Patricia I Young
(74) *Attorney, Agent, or Firm* — Birch, Stewart, Kolasch & Birch, LLP

(57) ABSTRACT

A camera module and an apparatus for calibrating position of the camera module are provided, the camera module according to an exemplary embodiment of the present disclosure comprises a first sensor unit configured to obtain a first image; a second sensor unit configured to obtain a second image; and a third sensor unit configured to obtain a third image, wherein the second sensor unit is spaced apart from the first sensor unit at a predetermined distance, and the third sensor unit is spaced apart from the second sensor unit at a predetermined distance.

17 Claims, 4 Drawing Sheets

LEFT IMAGE RIGHT IMAGE

LEFT IMAGE RIGHT IMAGE

LEFT IMAGE                RIGHT IMAGE

CAMERA MODULE AND APPARATUS FOR CALIBRATING POSITION THEREOF

CROSS-REFERENCE TO RELATED APPLICATION

The present application is based on, and claims priority from, Korean Application Numbers 10-2012-0095343, filed on Aug. 30, 2012, and 10-2012-0107002, filed on Sep. 26, 2012, the disclosures of which are incorporated by reference herein in their entirety.

BACKGROUND OF THE INVENTION

Field of the Invention

Aspects of the present disclosure relate to a camera module and an apparatus for calibrating position thereof.

Description of Related Art

A convergence angle is an intersection angle of two centerlines of stereo camera when the two centerlines for an object are matched. In the stereo camera, the centerlines of left and right eyes must match a center of a viewed object to allow the stereo camera to three-dimensionally view the object like human eyes, whereby eye tiredness can be reduced.

A method of performing a calibration on an image itself has been conventionally used to control the convergence angle of left and right eyes obtained by the stereo camera. FIG. 1 illustrates an example configured to control the convergence angle according to prior art.

FIG. 1A illustrates a state in which each centerline of left and right eyes obtained by a stereo camera are not matched. An conventional automatic convergence control apparatus uses a method in which images are cut out by aligning left and right images (i.e., centerlines of left/right images are matched) as shown in FIG. 1B, and images are cut out for controlling the convergence angle as shown in FIG. 1C. Portions shown in black color in FIGS. 1B and 1C are images that were cut out.

As noted from the foregoing, the conventional convergence angle control method is to align left and right images and to cut off the images for convergence angle control to generate portions that cannot use the inputted images, and it is inevitable to suffer from disadvantage of image loss.

Meantime, because in general a stereo camera system generates a depth image by using left and right images photographed by using two image sensors, the stereo camera system suffers from a difficulty in generation of the depth image if a distance between two cameras is too close.

SUMMARY OF THE INVENTION

Exemplary aspects of the present disclosure are to substantially solve at least the above problems and/or disadvantages and to provide at least the advantages as mentioned below. Thus, the present disclosure is directed to provide a camera module configured to simultaneously extract a 3D image and a 3D depth.

The present disclosure is also directed to provide an apparatus for calibrating position of a camera module configured to optically calibrate a position for convergence angle in response to movement of the camera module.

In one general aspect of the present disclosure, there may be provided a camera module, comprising: a first sensor unit configured to obtain a first image; a second sensor unit configured to obtain a second image; and a third sensor unit configured to obtain a third image, wherein the second sensor unit is spaced apart from the first sensor unit at a predetermined distance, and the third sensor unit is spaced apart from the second sensor unit at a predetermined distance.

In some exemplary of the present invention, the first, second and third sensor units may be substantially arranged in a row.

In some exemplary of the present invention, the first, second and third sensor units may comprise CCD sensors or CMOS sensors.

In another general aspect of the present disclosure, there may be provided an image processing apparatus, the apparatus comprising: a generator configured to generate a 3D image using a first image and a second image from a first sensor unit and a second sensor unit; and an extractor configured to extract a depth information using the first image and a third image from the first sensor unit and a third sensor unit.

In some exemplary of the present invention, the second sensor unit may be spaced apart from the first sensor unit at a predetermined distance, and the third sensor unit may be spaced apart from the second sensor unit at a predetermined distance.

In some exemplary of the present invention, the first, second and third sensor units may be substantially arranged in a row.

In some exemplary of the present invention, the first, second and third sensor units may comprise CCD sensors or CMOS sensors.

In another general aspect of the present disclosure, there may be provided an apparatus for calibrating position of a camera module, the apparatus comprising: a controller configured to determine a difference of a first and a second images by comparing a position of the first image from a first sensor unit with a position of the second image inputted from a second sensor unit; and a driving unit configured to move the second sensor unit in response to control of the controller.

In some exemplary of the present invention, the controller may be further configured to determine a moving degree of the second sensor unit in response to the difference.

In some exemplary of the present invention, wherein the controller may be further configured to generate a driving signal in response to the moving degree of the second sensor unit and transmit the driving signal to the driving unit.

In some exemplary of the present invention, the movement may include one of a shift, a rotation and a tilt.

In some exemplary of the present invention, the driving unit may move the second sensor unit in response to a maximum moving angle.

In some exemplary of the present invention, the camera module may comprise the first sensor unit configured to obtain the first image, a first lens configured to transmit an inputted image to the first sensor unit, the second sensor unit configured to obtain the second image, and a second lens configured to transmit an inputted image to the second sensor unit.

In some exemplary of the present invention, the driving unit may move the second sensor unit in response to the maximum moving angle.

In some exemplary of the present invention, a diameter of the second lens may be determined by an effective pixel area of the second sensor unit and the maximum moving angle of the driving unit.

In some exemplary of the present invention, the first sensor unit may include a sensor unit of an FF (Fixed Focus) type or an AC (Auto Convergence) type.

In some exemplary of the present invention, the second sensor unit may include a sensor unit of an AC (Auto Convergence) type.

The exemplary embodiments of the present disclosure have an advantageous effect in that a 3D image can be generated and simultaneously depth information can be effectively extracted by realizing a camera module structure arranged with at least three sensor units.

The exemplary embodiments of the present disclosure also have an advantageous effect in that auto convergence is possible without image loss by directly receiving an image for auto convergence by moving a camera module.

DETAILED DESCRIPTION OF PREFERRED EMBODIMENTS

Advantages and features of the present disclosure may be understood more readily by reference to the following detailed description of exemplary embodiments and the accompanying drawings. Thus, the present disclosure is not limited to the exemplary embodiments which will be described below, but may be implemented in other forms. Accordingly, the described aspect is intended to embrace all such alterations, modifications, and variations that fall within the scope and novel idea of the present disclosure.

Now, exemplary embodiments of the present disclosure will be described in detail with reference to the accompanying drawings.

Figure 2:
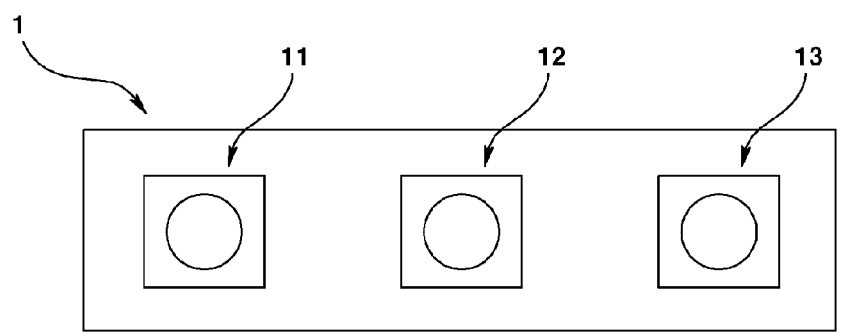
FIG. 2 is a front view illustrating a schematic structure of a camera module according to an exemplary embodiment of the present disclosure.

FIG. 2 is a front view illustrating a schematic structure of a camera module according to an exemplary embodiment of the present disclosure.

The camera module (1) of FIG. 2 may generate a 3D (three-dimensional) image by being arranged at an electronic product, e.g., a frame of a TV or a bezel of a smart device.

Referring to FIG. 2, the camera module (1) according to an exemplary embodiment of the present disclosure may comprise a first sensor unit (11), a second sensor unit (12) and a third sensor unit (13). The second sensor unit (12) may be spaced apart from the first sensor unit (11) at a predetermined distance, and the third sensor unit (13) may be spaced apart from the second sensor unit (12) at a predetermined distance. Furthermore, the first, second and third sensor units (11, 12 and 13) may be substantially arranged in a row.

Each of the first, second and third sensor units (11, 12 and 13) may be a sensor including CCD (Charged Coupled Device) sensors or CMOS (Complementary Metal-Oxide Semiconductor) sensors, for example, but the present disclosure is not limited thereto, and any other devices capable of performing similar functions thereto may be used for the first, second and third sensor units (11, 12 and 13).

The first sensor unit (11) is a reference sensor unit commonly participating in generating a 3D image and depth information. The first sensor unit (11) alone may obtain a 2D image.

The first sensor unit (11) and the second sensor unit (12) may photograph left and right images for 3D image. That is, the first sensor unit (11) may obtain a left image and the second sensor unit (12) may obtain a right image, for example. On the other hand, the first sensor unit (11) may obtain a right image and the second sensor unit (12) may obtain a left image. In the exemplary embodiment of the present disclosure, explanation will be provided for a case where an image obtained by the first sensor unit (11) is a left image and an image obtained by the second sensor unit (12) is a right image, for convenience sake.

At this time, a shorter distance of binocular disparity is better for the first and second sensor units (11, 12) in order to maintain the distance to a minimum.

Furthermore, the first sensor unit (11) and the third sensor unit (13) may photograph left and right images for generating depth information. In order to extract depth information of a 3D image, a distance of sensor units for photographing left and right images must be maintained at a predetermined space, and if the distance is too short, reliability of extracted depth information is disadvantageously deteriorated. User dizziness may be generated if the reliability-deteriorated depth information is used for a 3D game image.

Hence, the depth information may be extracted in the exemplary embodiment of the present disclosure, using an image photographed by the first sensor unit (11) and the third sensor unit (13) more distanced from the first sensor unit than the second sensor unit (12). Because it is assumed that the first sensor unit (11) obtains a left image of 3D image in the exemplary embodiments of the present disclosure, the right image may be obtained by the third sensor unit (13) for extracting the depth information.

That is, the 3D image and the reliability-high depth information can be simultaneously extracted by realizing a camera module arranged with the first to third sensor units (11 to 13) in the exemplary embodiment of the present disclosure.

Although the camera module (1) according to the exemplary embodiment of the present disclosure may comprise other various components than the abovementioned first, second and third sensor units (11, 12 and 13), explanation on a camera module formed with other components will be omitted as it is irrelevant to the present disclosure.

Figure 3:
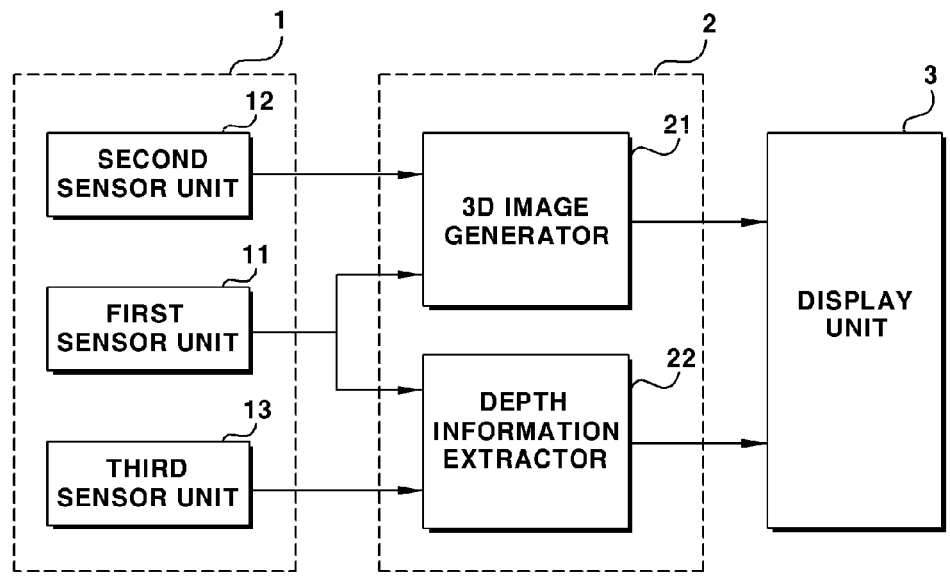
FIG. 3 is a block diagram illustrating to explain a process of an image outputted from a camera module according to another exemplary embodiment of the present disclosure.

FIG. 3 is a block diagram illustrating to explain a process of an image outputted from a camera module according to the exemplary embodiment of the present disclosure.

Referring to FIG. 3, an image outputted from the camera module (1) according to one exemplary embodiment of the present disclosure may be inputted into an image processing unit (2), and a display unit (3) may display a 3D image reflected with the depth information by using the 3D image and the depth information generated by the image processing unit (2).

The image processing unit (2) according to the exemplary embodiment of the present disclosure may comprise a 3D image generator (21) and a depth information extractor (22). The 3D image generator (21) may generate the 3D image by using left and right images inputted from the first and second sensor units (11 and 12). The method of generating a 3D image is well known to the skilled in the art such that a detailed explanation thereto is omitted hereinafter.

Furthermore, the depth information extractor (22) may extract the depth information using the left and right images inputted from the first and third sensor units (11 and 13). The method of extracting the depth information is well known to the skilled in the art such that a detailed explanation thereto is omitted hereinafter. For example, the depth information extractor (22) may extract depth information using a stereo matching, but the present disclosure is not limited to the stereo matching method.

Figure 4:
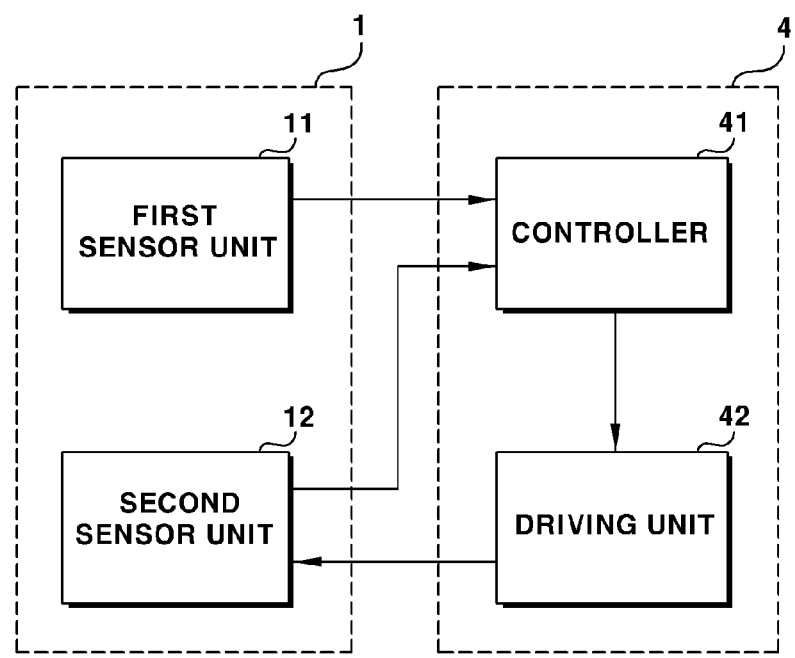
FIG. 4 is a block diagram illustrating to explain an apparatus for calibrating position of a camera module (hereinafter referred to as "position calibrating apparatus", or "apparatus") according to a second exemplary embodiment of the present disclosure.

FIG. 4 is a block diagram illustrating to explain an apparatus for calibrating position of a camera module (4, "position calibrating apparatus") according to a second exemplary embodiment of the present disclosure, where the position calibrating apparatus (4) may be applied to the first and second sensor units (11 and 12) of the camera module (1) of FIG. 1, or may be applied to the first and third sensor unit (11 and 13). That is, it is because the first and second sensor units (11 and 12) can obtain the left and right images, and the first and third sensor units (11 and 13) can also obtain the left and right images.

Although the following explanation is focused on a case where the position calibrating apparatus (4) is applied to the first and second sensor units (11 and 12), it should be apparent to a case where the position calibrating apparatus (4) can be applied to the first and third sensor units (11 and 13).

The position calibrating apparatus (4) according to the exemplary embodiment of the present disclosure is used to calibrate a position of the second sensor unit (12) of the camera module (1), and may comprise a controller (41) and a driving unit (42).

The first and second sensor units (11 and 12) are used to obtain left and right images, and explanation thereto has been already given in the foregoing, such that no more detailed elaboration thereto will be provided.

The position calibrating apparatus (4) according to the exemplary embodiment of the present disclosure uses the first sensor unit (11) as a reference, at which time the first sensor unit (11) may be a sensor unit of FF (Fixed Focus) type or an AC (Auto Convergence) type. Furthermore, the second sensor unit (12) is a sensor unit for control and may be a sensor of an AC type. However, the methods given above are just exemplary, and the present disclosure is not limited thereto and it should be apparent that other methods can be utilized.

The controller (41) may compare positions of the left and right from the first and second sensor units (11 and 12) and determine a difference of the right image relative to the left image. Furthermore, the controller (41) may determine a moving degree of the second sensor unit (12) relative to the first sensor unit (11) based on the determined difference, and transmit a driving signal to the driving unit (42) by generating the driving signal in response to the moving degree.

Figure 1A:
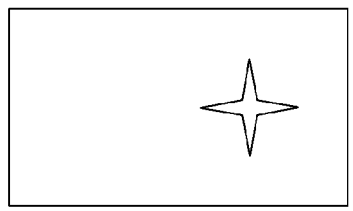
FIGS. 1A to 1C are exemplary views illustrating an auto convergence method according to prior art.
Figure 1A:
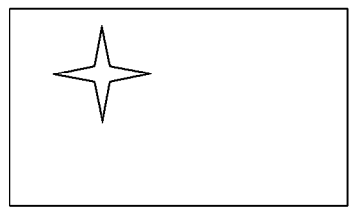
Figure 1B:
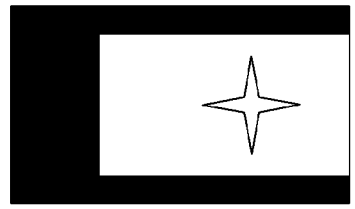
Figure 1B:
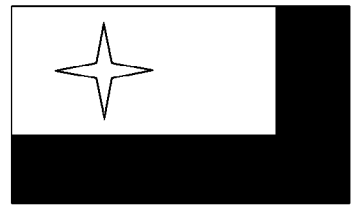
Figure 1C:
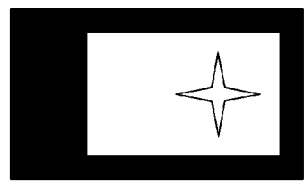
Figure 1C:
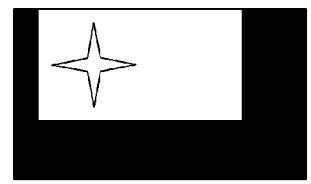

That is, the controller (41) compares the positions of the left and right images by receiving the left and right images inputted as shown in FIG. 1A, and allows the left and right images to be inputted in a state for auto convergence as the driving unit (42) moves the second sensor unit (12). The controller (41) may include an ISP (Image Signal Processor) of an IC (Integrated Circuit) type, for example.

The driving unit (42) may receive the driving signal from the controller (41) and move the second sensor unit (12) in response to the driving signal. The driving unit (42) may include a VCM (Voice Coil Motor), or a silicone-type actuator, for example. The driving unit (42) moves the second sensor unit (12) in response to the driving signal from the controller (41), where the movement may include a shift, a rotation and a tilt. That is, the driving unit (42) may move the second sensor unit (12) to all directions (360°), at which time a maximum moving angle can be set up where the maximum moving angle is designated as "θ".

Figure 5A:
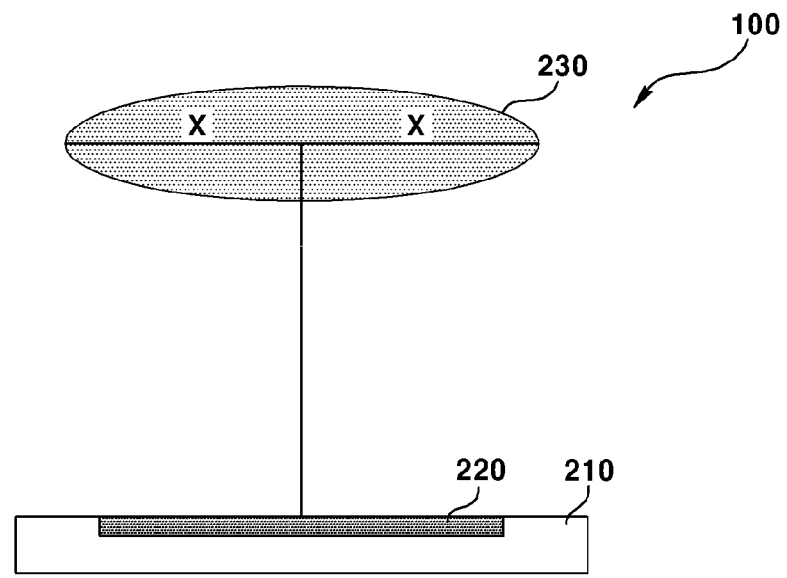
FIG. 5A is a schematic view of a camera module according to prior art.
Figure 5B:
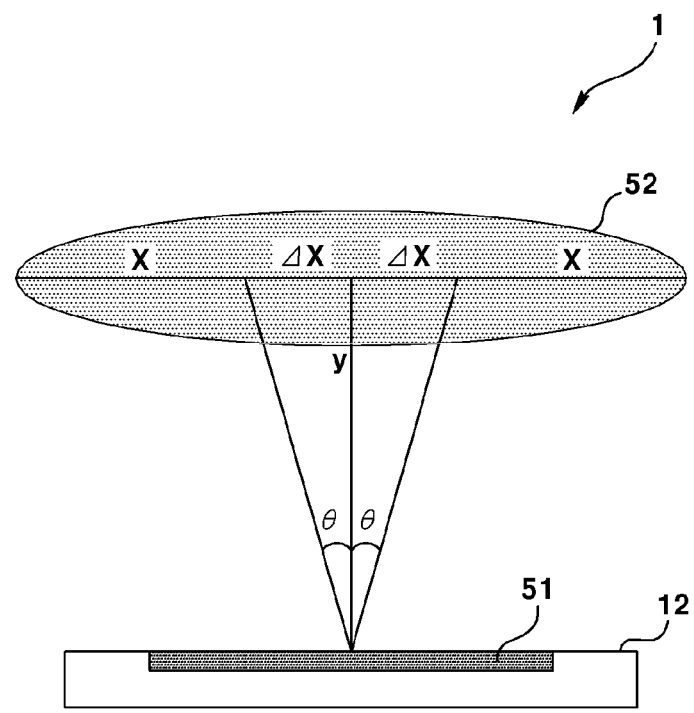
FIG. 5B is an exemplary view to schematically explain a camera module according to an exemplary embodiment of the present disclosure.

FIG. 5A is a schematic view of a camera module according to prior art, and FIG. 5B is an exemplary view to schematically explain a camera module according to an exemplary embodiment of the present disclosure, where both FIGS. 5A and 5B are views seen from lateral surfaces.

Referring to FIG. 5A, a conventional camera module (100) includes a sensor unit (110) and a lens (130), where an effective pixel area (120) of the sensor unit (110) is determined by a diameter (2x) of the lens (130).

The camera module (1) according to the exemplary embodiment of the present disclosure is configured such that the second sensor unit (12) is moved by the driving of the driver unit (42), where changes in size of a lens (52) is required, the detailed explanation of which will be given with reference to FIG. 5B.

In the explanation according to the exemplary embodiment of the present disclosure, configuration of the second sensor unit (12) moved by the driving of the driving unit (42) will be described. A lens (not shown) arranged over the first sensor unit (11) may be configured as shown in FIG. 5A, or may be configured as shown in FIG. 5B, because the first sensor unit (11) which is a reference sensor unit that is not moved.

Referring to FIG. 5B, in the camera module (1) according to the exemplary embodiment of the present disclosure, a lens (52) may be arranged over the second sensor unit (12), and an image inputted through the lens (52) may be obtained by the second sensor unit (12). However, although it is apparent that the camera module (1) according to the exemplary embodiment of the present disclosure may include other components, explanation on other components irrelevant to the exemplary embodiment of the present disclosure will be omitted.

A diameter of the lens (52) in the camera module (1) according to the exemplary embodiment of the present disclosure may be determined by the maximum moving angle (θ) of the driving unit (42). That is, the diameter of the lens (52) may be $2x+2\Delta x$, if the effective pixel area (51) of the second sensor unit (12) is same size of FIG. 5A, and a distance maximally movable by the maximum moving angle (θ) is $\Delta x$.

As noted from the foregoing, the camera module (1) according to the exemplary embodiment of the present disclosure can advantageously prevent an image from vignetting even if the driving unit (42) moves the second sensor unit (12), because the size of the lens (52) becomes greater than that of the conventional camera module (100).

Although exemplary embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

What is claimed is:

1. A camera module, comprising:
a first sensor unit configured to obtain a first image;
a second sensor unit configured to obtain a second image for generating a 3D image;
a third sensor unit configured to obtain a third image for generating depth information;
a driving unit configured to move the second sensor unit in response to a maximum moving angle;
a first lens configured to transmit the first image to the first sensor unit; and
a second lens configured to transmit the second image to the second sensor unit,
wherein the second sensor unit is spaced apart from the first sensor unit at a predetermined distance, and the third sensor unit is spaced apart from the second sensor unit at a predetermined distance,
wherein a distance between the first sensor unit and the second sensor unit is shorter than that between the first sensor unit and the third sensor unit,
wherein the first sensor unit is a reference sensor unit which participates with the second sensor unit and the third sensor unit to generate the 3D image and the depth information, and
wherein a diameter of the second lens is determined by an effective pixel area of the second sensor unit and the maximum moving angle of the driving unit.

2. The camera module of claim 1, wherein the first, second and third sensor units are substantially arranged in a row.

3. The camera module of claim 1, wherein the first, second and third sensor units comprise CCD sensors or CMOS sensors.

4. An image processing apparatus, the apparatus comprising:
a generator configured to generate a 3D image using a first image and a second image from a first sensor unit and a second sensor unit, respectively;
an extractor configured to extract a depth information using the first image and a third image from the first sensor unit and a third sensor unit, respectively;
a driving unit configured to move the second sensor unit in response to a maximum moving angle;
a first lens configured to transmit the first image to the first sensor unit; and
a second lens configured to transmit the second image to the second sensor unit,
wherein a distance between the first sensor unit and the second sensor unit is shorter than that between the first sensor unit and the third sensor unit,
wherein the first sensor unit is a reference sensor unit which participates with the second sensor unit and the third sensor unit to generate the 3D image and the depth information, and
wherein a diameter of the second lens is determined by an effective pixel area of the second sensor unit and the maximum moving angle of the driving unit.

5. The apparatus of claim 4, wherein the second sensor unit is spaced apart from the first sensor unit at a predetermined distance, and the third sensor unit is spaced apart from the second sensor unit at a predetermined distance.

6. The apparatus of claim 4, wherein the first, second and third sensor units are substantially arranged in a row.

7. The apparatus of claim 4, wherein the first, second and third sensor units comprise CCD sensors or CMOS sensors.

8. An apparatus for calibrating position of a camera module, the apparatus comprising:
a controller configured to determine a difference of a first and a second images by comparing a position of the first image from a first sensor unit with a position of the second image inputted from a second sensor unit; and
a driving unit configured to move the second sensor unit in response to control of the controller,
wherein a size of a second lens arranged over the second sensor unit is determined in consideration of a maximum moving angle of the driving unit,
wherein the first sensor unit is a reference sensor unit that is not moved, and
wherein a diameter of the second lens is determined by an effective pixel area of the second sensor unit and the maximum moving angle of the driving unit.

9. The apparatus of claim 8, wherein the controller is further configured to determine a moving degree of the second sensor unit in response to the difference.

10. The apparatus of claim 9, wherein the controller is further configured to generate a driving signal in response to the moving degree of the second sensor unit and transmit the driving signal to the driving unit.

11. The apparatus of claim 8, wherein the movement includes one of a shift, a rotation and a tilt.

12. The apparatus of claim 8, wherein the driving unit moves the second sensor unit in response to the maximum moving angle.

13. The apparatus of claim 8, wherein the camera module comprises:
the first sensor unit configured to obtain the first image,
a first lens configured to transmit the first image to the first sensor unit,
the second sensor unit configured to obtain the second image, and
the second lens configured to transmit the second image to the second sensor unit.

14. The apparatus of claim 13, wherein the driving unit moves the second sensor unit in response to the maximum moving angle.

15. The apparatus of claim 8, wherein the first sensor unit includes a sensor unit of an FF (Fixed Focus) type or an AC (Auto Convergence) type.

16. The apparatus of claim 8, wherein the second sensor unit includes a sensor unit of an AC (Auto Convergence) type.

17. The apparatus of claim 8, wherein the diameter of the second lens is $2x+2\Delta x$, if a radius of the camera module is $x$ and a distance maximally movable by the maximum moving angle ($\theta$) is $\Delta x$.

* * * * *